United States Patent
Murdoch et al.

(10) Patent No.: US 10,941,824 B2
(45) Date of Patent: Mar. 9, 2021

(54) RAIL BRAKE

(71) Applicant: Portal Crane Parts Ltd.

(72) Inventors: Allan Roy Murdoch, Port Coquitlam (CA); Igor Berliant, Port Coquitlam (CA)

(73) Assignee: Portal Crane Parts Ltd., Port Coquitlam (CA)

( * ) Notice: Subject to any disclaimer, the term of this patent is extended or adjusted under 35 U.S.C. 154(b) by 0 days.

(21) Appl. No.: 15/553,541

(22) PCT Filed: Feb. 25, 2016

(86) PCT No.: PCT/CA2016/000055
§ 371 (c)(1),
(2) Date: Aug. 24, 2017

(87) PCT Pub. No.: WO2016/134453
PCT Pub. Date: Sep. 1, 2016

(65) Prior Publication Data
US 2018/0238407 A1 Aug. 23, 2018

Related U.S. Application Data

(60) Provisional application No. 62/120,758, filed on Feb. 25, 2015.

(51) Int. Cl.
F16D 65/16 (2006.01)
B60T 1/14 (2006.01)
(Continued)

(52) U.S. Cl.
CPC .............. F16D 65/16 (2013.01); B60T 1/14 (2013.01); B61H 7/04 (2013.01); B66C 9/18 (2013.01);
(Continued)

(58) Field of Classification Search
CPC .... B60T 1/14; B61H 7/04; B61H 7/12; B66C 9/18; F16D 63/008; F16D 65/14;
(Continued)

(56) References Cited

U.S. PATENT DOCUMENTS 3,877,549 A * 4/1975 Clark, Jr. ................. B66C 9/18
188/38
4,014,413 A * 3/1977 Monks ..................... B61H 7/00
188/170

(Continued)

FOREIGN PATENT DOCUMENTS

CA 2055260 A1 5/1992
CN 203715087 U 7/2014
(Continued)

OTHER PUBLICATIONS

Etended European Search Report for Application No. 16754685.2, dated Aug. 13, 2018 in 9 pages.

Primary Examiner — Robert A. Siconolfi
Assistant Examiner — San M Aung
(74) Attorney, Agent, or Firm — Knobbe, Martens Olson & Bear, LLP

(57) ABSTRACT

An extended range, consistent force rail brake comprising an adjustable wedge assembly operatively situated between the main power spring(s) and the brake shoe(s) for selectively taking up the vertical distance that the brake shoe is required to travel between the brake release position and an initial railhead contact position. The adjustable wedge assembly is thus selectively expandable in the vertical orientation, and may comprise: an upper block that is operatively connected, either directly or indirectly, to the power spring; a lower wedge rigidly affixed to a replaceable brake shoe; and an intermediate wedge that is located by suitable bearings and/or linkages for transverse, generally horizontal slidable engagement between the upper block and the lower wedge.

(Continued)

Each of the upper block and lower wedge elements of the wedge assembly are, respectively, located by suitable bearings and/or linkages for generally vertical translational motion (but very little, if any, lateral or longitudinal horizontal motion) within upper and lower guides provided on a frame of the rail brake.

2 Claims, 6 Drawing Sheets

(51) Int. Cl.
| | | |
|---|---|---|
| *B61H 7/04* | (2006.01) | |
| *B66C 9/18* | (2006.01) | |
| *F16D 63/00* | (2006.01) | |
| *F16D 121/12* | (2012.01) | |
| *F16D 121/14* | (2012.01) | |
| *F16D 125/66* | (2012.01) | |

(52) U.S. Cl.
CPC ........ *F16D 63/008* (2013.01); *F16D 2121/12* (2013.01); *F16D 2121/14* (2013.01); *F16D 2125/66* (2013.01); *F16D 2200/003* (2013.01); *F16D 2200/0021* (2013.01)

(58) Field of Classification Search
CPC ............... F16D 65/16; F16D 2200/003; F16D 2200/0021; F16D 2121/12; F16D 2121/14; F16D 2125/66
USPC .......................................................... 188/170
See application file for complete search history.

(56) References Cited

U.S. PATENT DOCUMENTS

| | | | |
|---|---|---|---|
| 4,234,060 A | 11/1980 | Barsted | |
| 6,802,402 B2 * | 10/2004 | Bausch | B60T 13/04 188/161 |
| 7,975,811 B2 | 7/2011 | Berliant | |
| 2002/0117357 A1 * | 8/2002 | Hugel | B66B 5/22 187/376 |
| 2007/0051563 A1 * | 3/2007 | Oh | B66B 5/22 187/371 |
| 2011/0083927 A1 * | 4/2011 | Herges | F16D 65/18 188/72.2 |

FOREIGN PATENT DOCUMENTS

| | | |
|---|---|---|
| CN | 203902573 U | 10/2014 |
| DE | 102010045109 A1 | 3/2012 |
| EP | 1721086 A1 | 11/2006 |
| SU | 1763274 A1 | 9/1992 |

* cited by examiner

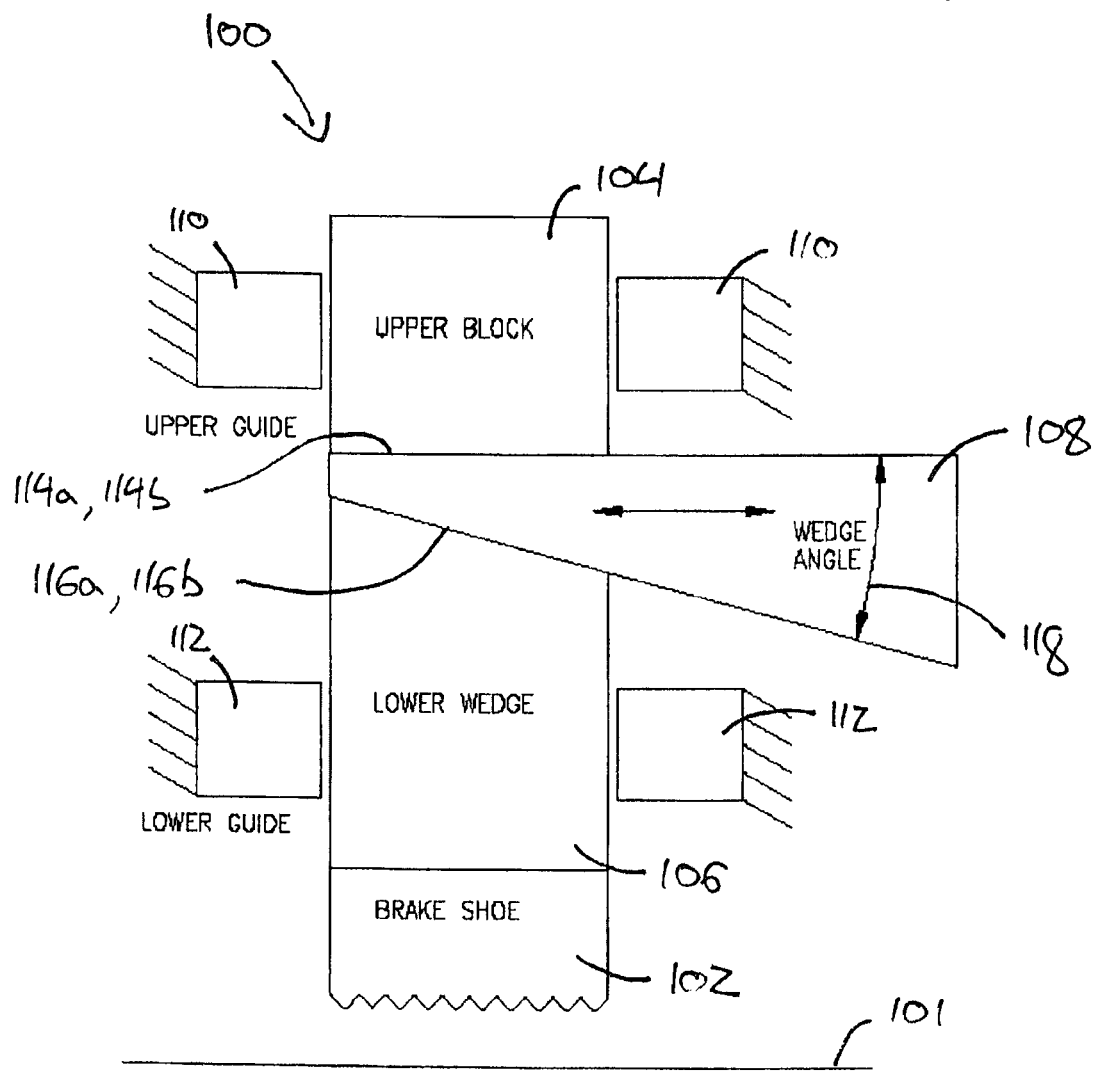

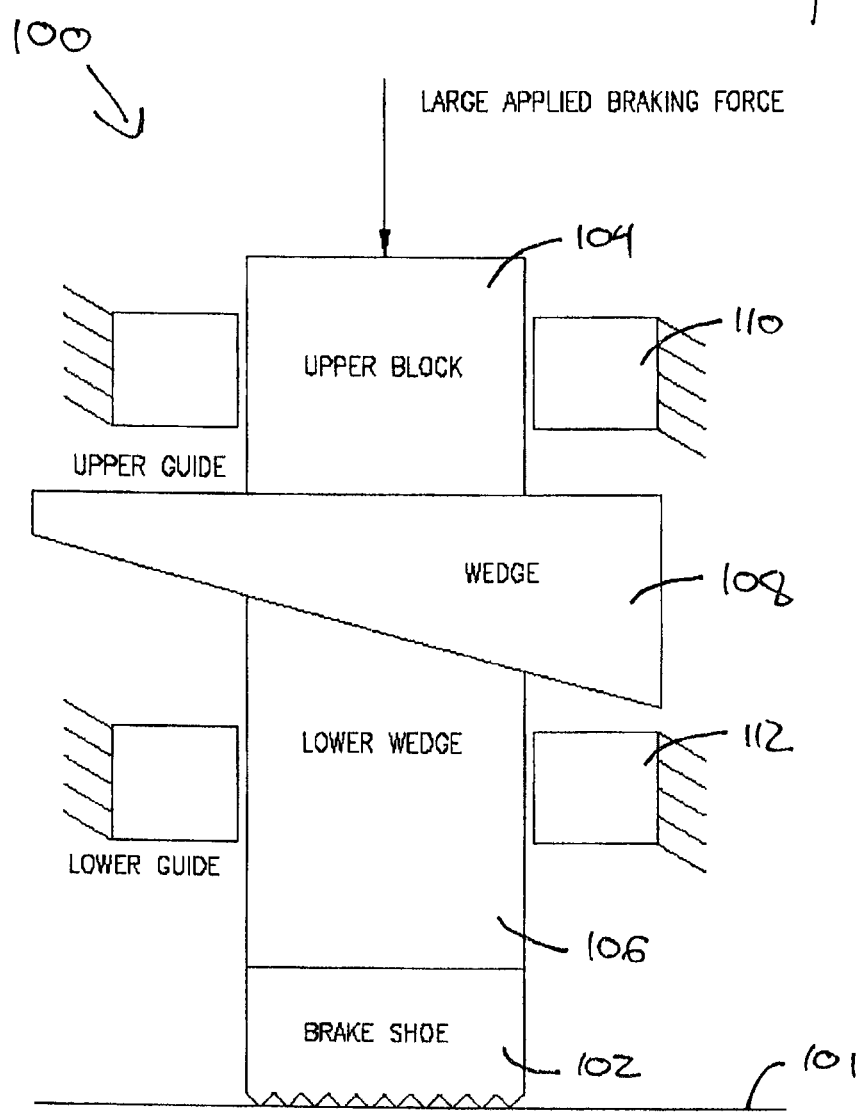

RAIL BRAKE

CROSS-REFERENCE TO RELATED APPLICATIONS

This application is the U.S. National Phase under 35. U.S.C. § 371 of International Application PCT/CA2016/000055, filed Feb. 25, 2016, which claims the benefit of U.S. Provisional Application No. 62/120,758, filed Feb. 25, 2015. The disclosures of the above-described applications are hereby incorporated by reference in their entirety.

TECHNICAL FIELD

In embodiments of the presently disclosed subject matter, there is provided a rail brake for braking or anchoring a rail-mounted machine such as a crane.

BACKGROUND

Hydraulically releasable spring-set rail brakes for braking or anchoring rail mounted equipment by pressing a hardened steel brake shoe onto the top surface of a rail (i.e. onto the railhead) under spring force are generally known. In a typical arrangement, when the rail brake is in a release position, a brake shoe is held at a selected vertical distance above the railhead to provide sufficient clearance for track run-out, debris and the like, and at least one associated main power spring is correspondingly held in compression by hydraulic force acting on a piston within a cylinder. As the hydraulic pressure within the cylinder is reduced under control of an operator to a value that is below the restorative spring force of the main power springs, the springs relax, causing the rail brake to advance into a brake set position, in which the piston retreats into the cylinder and the brake shoe correspondingly advances vertically downward into contact with and is pressed onto the railhead.

However, since the restorative spring force of the power springs is highest when the springs are at maximum compression (i.e. in the brake release position) and decreases throughout the stroke of the springs as they relax into the brake set position, a relatively large component of the stored potential energy of the power springs may effectively be wasted during the initial advancement of the brake shoe into contact with the railhead (for which only a comparatively small force is normally required), leaving a relatively small component of the restorative spring force available to press the shoe onto the railhead and do the actual braking. This function of reducing spring force throughout the relaxation stroke of the power springs also limits the vertical distance through which the brake shoe of known rail brakes may be displaced before meeting (and/or deflecting) the railhead, whilst still being capable of providing adequate braking capacity.

SUMMARY

In embodiments of the presently disclosed subject matter, there is accordingly provided an extended range, consistent force rail brake comprising an adjustable wedge assembly operatively situated between the main power spring(s) and the brake shoe(s) for selectively taking up the vertical distance that the brake shoe is required to travel between the brake release position and an initial railhead contact position, before the application of main spring force presses the brake shoe onto the railhead (i.e. fully into the brake set position). The adjustable wedge assembly is thus selectively expandable in the vertical orientation, and may comprise: an upper block that is operatively connected, either directly or indirectly, to the power spring; a lower wedge rigidly affixed to a preferably replaceable brake shoe; and an intermediate wedge that is located by suitable bearings and/or linkages for transverse, generally horizontal slidable engagement between the upper block and the lower wedge. Each of the upper block and lower wedge elements of the wedge assembly are, respectively, located by suitable bearings and/or linkages for generally vertical translational motion (but very little, if any, lateral or longitudinal horizontal motion) within upper and lower guides provided on a frame of the rail brake. In some embodiments, such as those illustrated herein, the transverse vertical cross-section of the lower wedge may comprise a right trapezoid. Other embodiments in which the orientation of the block and wedge elements is essentially inverted (i.e. wherein an intermediate wedge is slidably engaged between an upper wedge and a lower block) are also contemplated and within the scope of the present disclosure.

The engagement surfaces between the upper block, intermediate wedge and lower wedge are selected for relatively high coefficients of static friction, and the wedge angle of the intermediate wedge (and, of course, the corresponding contact angle of the lower wedge) is selected such that, in combination, the transverse, horizontal component of the downwards vertical force exerted on the assembly by relaxation of the main power spring (between at least the railhead contact and brake set positions of the rail brake) is substantially less than the force that would be required to overcome the horizontal component of the frictional force between the engagement surfaces and to drive the intermediate wedge out from between the upper block and lower wedge. In other words, the engagement surfaces and wedge angle are selected such that the resistance to expulsion of intermediate wedge is correspondingly high under large vertically applied loads, thereby providing an acceptable margin of operational safety.

By way of example, a wedge assembly comprising a wedge angle of 14°, engagement surfaces of the upper block and lower wedge formed of mild steel, and engagement surfaces of the intermediate wedge formed of 6061 T6 aluminum alloy, have empirically been shown to remain self-locking under application of a vertical load of at least as much as 440,000 N. Some or all of the engagement surfaces may alternately or in addition be textured or serrated, and/or comprise combinations of known brake-type friction materials and steels (e.g. sintered metallic/mild steel). Many suitable combinations are possible, as would be apparent to those of skill in the art having regard to the foregoing principles.

In some embodiments, a wedge spring biases the intermediate wedge into engagement between the upper block and lower wedge, and a wedge retracting linkage is provided for withdrawing the intermediate wedge from engagement between the upper block and lower wedge in a direction that is opposite to the biasing force supplied by the wedge spring.

When the rail brake transitions from the brake release position to the railhead contact position, the lower wedge is released and permitted to advance vertically downward until the brake shoe makes contact with the railhead. At the same time, the biasing force of the wedge spring draws the intermediate wedge horizontally deeper into engagement between the upper block and lower wedge, such that any slack created by the downward translational movement of the lower wedge is filled. In other words, the overall vertical height of adjustable wedge assembly is expanded.

Once the vertical height of the wedge assembly has been expanded as above, main spring force presses the brake shoe onto the railhead, bringing the brake fully into the brake set position. Since little or no relaxation of the main power spring is required to advance the brake shoe into contact with the railhead, essentially the full restorative spring force (and stroke) of the power spring is available for pressing the brake shoe onto the railhead, thereby increasing the consistency of braking force applied (by reducing dependence on height, and by accommodating deflection of the rail under pressure from the brake), and extending the effective operational range of the rail brake.

When the rail brake is released, and the main power spring is once again compressed by increasing hydraulic force acting on a piston within a cylinder. In embodiments that include a wedge retracting linkage, this movement of the piston brings it into direct or indirect contact with the retracting linkage and acts upon the retracting linkage so as to cause the withdrawal of the intermediate wedge from engagement between the upper block and lower wedge in a direction that is opposite to the biasing force of the wedge spring. In some embodiments, the retracting linkage is configured for a 5:1 lever ratio, such that the intermediate wedge is moved 5 units of length for each one unit of length that the piston acts on the retracting linkage.

In the specific embodiments illustrated herein below, the main power spring comprises a single helical (i.e. coil) spring. However, various alternative biasing means, such as disc springs, self-locking cams, and the like may also be employed for the provision of sufficient suitable braking force, as would be apparent to those of skill in the art.

BRIEF DESCRIPTION OF THE DRAWINGS

For a fuller understanding of the nature and advantages of the disclosed subject matter, as well as the preferred modes of use thereof, reference should be made to the following detailed description, read in conjunction with the accompanying drawings. In the drawings, like reference numerals designate like or similar steps or parts.

FIG. 5 is a schematic cross-sectional view of the adjustable wedge assembly of the rail brake of FIG. 1, showing the adjustable wedge assembly in the brake release position.

FIG. 6 is a schematic cross-sectional view of the adjustable wedge assembly of the rail brake of FIG. 1, showing the adjustable wedge assembly in the brake set position.

DETAILED DESCRIPTION OF SPECIFIC EMBODIMENTS

Figure 1:
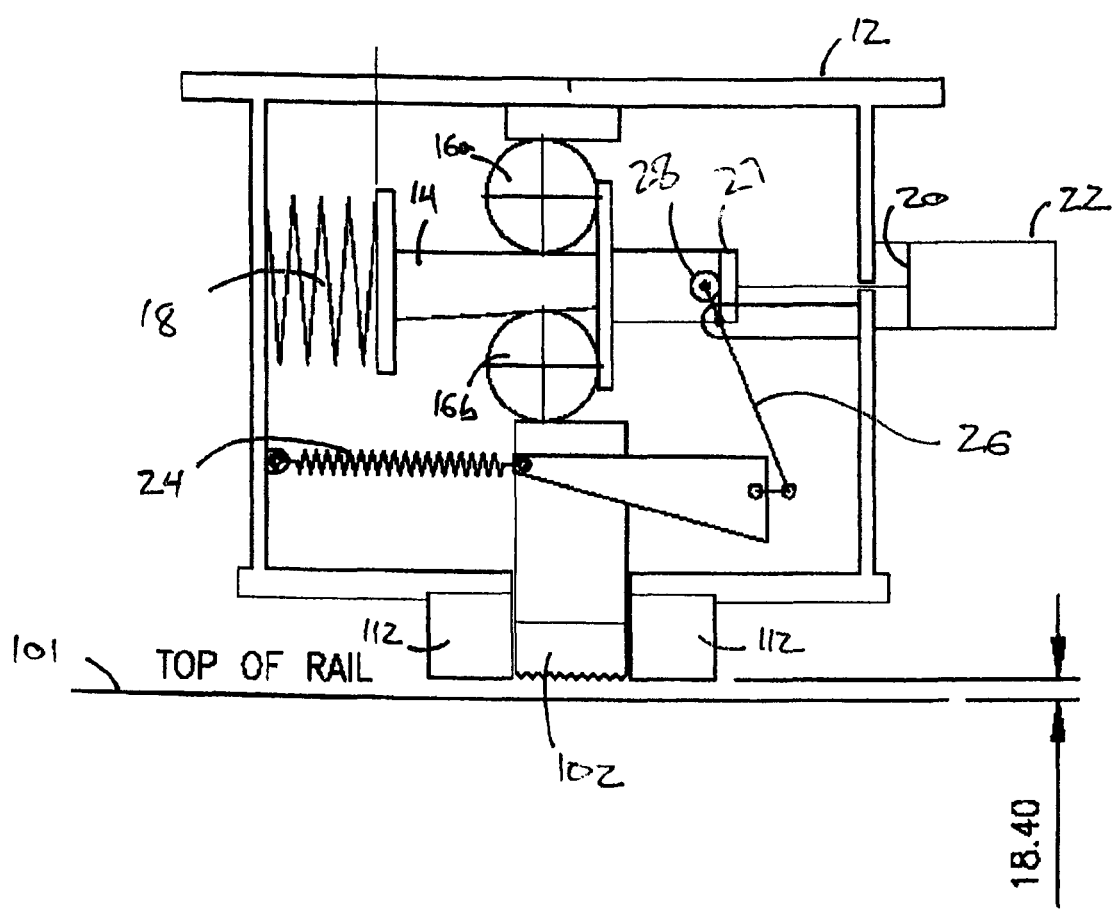
FIG. 1 is a vertical cross-sectional view taken along the longitudinal midline of a rail brake according to one embodiment of the presently described subject matter, showing the rail brake in the brake release position above a railhead, where clearance between the rail brake frame and the railhead is 18.40 units.

The following description of specific embodiments is merely exemplary in nature and is in no way intended to limit the invention, its application, or uses. The rail brake of the present invention may take form in a number of different embodiments depending upon the particular requirements of the use, such as the nature, size and weight of the rail-mounted equipment to be anchored.

With reference first to FIGS. 5 and 6, there is illustrated an adjustable wedge assembly 100 for a rail brake 10 in accordance with one embodiment of the presently described subject matter. The wedge assembly 100 is selectively expandable in the vertical orientation, and as will be described further below in relation to the specific embodiment of FIGS. 1-4, is operatively situated between a main power spring 18 (see FIGS. 1-4) and a replaceable brake shoe 102 for selectively taking up the vertical distance that the brake shoe 102 is required to travel between a brake release position (as seen in FIG. 5) and an initial railhead contact position in which the brake shoe 102 is in contact with a railhead 101. Once the vertical height of the wedge assembly 100 has thus been expanded to fill this slack distance between the brake release and railhead contact positions of the rail brake, the full restorative force of power spring 18 is released, causing the rail brake to enter into a brake set position (see FIG. 6), wherein the brake shoe 102 is pressed vertically downward onto the railhead 101.

Wedge assembly 100 comprises an upper block 104 that is operatively connected, either directly or indirectly (such as by a power wedge cam 14 and rollers 16a, 16b, as is further described below), to a main power spring 18; a lower wedge 106 rigidly affixed to brake shoe 102; and an intermediate wedge 108 that is located by suitable bearings and/or linkages (not shown) for transverse, generally horizontal slidable engagement between the upper block 104 and the lower wedge 106. Each of the upper block 104 and lower wedge 106 elements of wedge assembly 100 are, respectively, located by suitable bearings and/or linkages (not shown) for generally free vertical translational motion, but limited or no lateral or longitudinal horizontal translational motion, within opposing upper guides 110 and opposing lower guides 112 provided, respectively, on a frame 12 of the rail brake 10. In the illustrated embodiment, the transverse vertical cross-section of lower wedge 106 is right trapezoidal.

The corresponding engagement surfaces 114a, 114b, respectively, between the upper block 104 and intermediate wedge 108, and the engagement surfaces 116a, 116b, respectively, between the intermediate wedge 108 and lower wedge 106 are selected for relatively high coefficients of static friction, and the wedge angle 118 of the intermediate wedge 108 (and, of course, the corresponding contact angle of the lower wedge 106) is selected such that, in combination, the transverse, horizontal component of a downwards vertical force acting on the intermediate wedge 108 of assembly 100 by relaxation of the main power spring 18 (during at least the railhead contact and brake set positions of the rail brake 10) is substantially less than the force that would be required to overcome the horizontal component of the frictional force between the upper and lower engagement surfaces 114, 116 and to drive the intermediate wedge 108 horizontally out from between the upper block 104 and lower wedge 106. In other words, the engagement surfaces 114, 116 and wedge angle 118 are selected such that the resistance to expulsion of intermediate wedge 108 is correspondingly high under a large vertically applied load, thereby providing an acceptable margin of operational safety. Either or both of engagement surfaces 114, 116 may alternately or in addition comprise textured or serrated surface treatments, and/or comprise combinations of known brake-type friction materials and steels (e.g. sintered metallic/mild steel). In one embodiment, a wedge assembly 100 comprising a wedge angle of 14°, and in which engagement surfaces of the upper block 114a and lower wedge 116b formed of mild steel, and the engagement surfaces of the intermediate wedge 114b, 116a formed of 6061 T6 aluminum alloy, have been shown to remain self-locking under application of a vertical load of at least as much as 440,000 N.

Turning now to FIGS. 1-4, one specific embodiment of a rail brake 10 is shown. Rail brake 10 generally comprises a frame 12 within which a wedge assembly 100 is supported by suitable bearings and/or linkages (not shown) for generally free vertical translational motion, but limited or no lateral or longitudinal horizontal translational motion, within at least one opposing pair of guides 112. A generally frustoconical power wedge cam 14 is located between upper and lower force generation rollers 16a, 16b, respectively, within frame 12, and is urged in a first, brake set direction by a generally horizontally disposed main power spring 18. A hydraulically actuated piston 20 is operably connected to the cam 14, and may be driven under control of an operator by hydraulic pressure in a second, brake release direction opposite to the brake set direction (i.e. against the biasing force of the power spring 18) from a hydraulic cylinder 22 that is formed into or operably connected to the frame 12.

In preferred embodiments, in order to enhance efficiency, rollers 16a and 16b are free rolling in the horizontal orientation (such that the rollers are able to move generally horizontally between the frame 12 and the wedge assembly 100 in conjunction with power wedge cam 14) and not mounted on axles or pivots. In other embodiments, conventional bearings may be substituted for rollers 16a, 16b.

In the illustrated embodiment, the frustoconical profile of power wedge cam 14 is shown as generally linear. However, in preferred embodiments, the profile of power wedge cam 14 may curve with variable geometry in order to produce linearly increasing mechanical advantage as the power spring 18 extends, thereby compensating for losses in spring force through extension. Through the selection of suitable cam profiles and dry-running with no lubrication between cam 14 and rollers 16a, 16b, the possibility of undesired relative movement of the rollers vis-à-vis the power cam may be minimized.

A wedge spring 24 biases the intermediate wedge 108 into engagement between the upper block 104 and lower wedge 106, and a pivotally mounted wedge retracting linkage 26 is provided for withdrawing the intermediate wedge 108 from engagement between the upper block 104 and lower wedge 106 in a direction that is opposite to the biasing force supplied by the wedge spring 24.

When the rail brake 10 is transitioned from the brake release position to the railhead contact position, the lower wedge 106 is released and permitted to advance vertically downward until the brake shoe 102 makes contact with the railhead 101. At the same time, the biasing force of the wedge spring 24 draws the intermediate wedge 108 horizontally deeper into engagement between the upper block 104 and lower wedge 106, such that any slack created by the downward translational movement of the lower wedge 106 is filled. In other words, the overall vertical height of adjustable wedge assembly 100 is expanded.

As the hydraulic pressure within the cylinder 22 is reduced under control of an operator to a value that is below the restorative spring force of the main power spring 18, the spring relaxes, causing the rail brake 10 to advance into the brake set position in which piston 20 retreats into the cylinder 22 and brake shoe 102 is correspondingly pressed vertically downward onto railhead 101 via the vertically expanded wedge assembly 100. Since very little relaxation of the main power spring 18 is required to advance the brake shoe 102 into contact with the railhead 101, essentially the full restorative spring force (and stroke) of the power spring 18 is available for pressing the brake shoe 102 onto the railhead 101, thereby increasing the consistency of braking force applied (by reducing dependence on height of shoe 102 vis-à-vis railhead 101), and extending the effective operational range of the rail brake.

When rail brake 10 is released, and the main power spring 18 is once again compressed by increasing hydraulic force acting on piston 20 within cylinder 22. Movement of piston 20 in the brake release direction brings piston 20 into contact (either directly or indirectly) with and acts upon retracting linkage 26, which in turn withdraws intermediate wedge 108 from engagement between the upper block 104 and lower wedge 106 in a direction that is opposite to the biasing force of the wedge spring 24. In the illustrated embodiment, retracting linkage 26 communicates with a retraction plate 27 of the piston 20 via a cam roller 28. In some embodiments, the arms of retracting linkage 26 are configured for a 5:1 lever ratio, such that pivotal motion of linkage 26 will cause intermediate wedge 108 to be moved 5 units of length for each one unit of length that the piston 20 acts on the retracting linkage 26.

In FIG. 1, rail brake 10 is shown in the fully released position, in which power spring 18 is fully compressed by hydraulic pressure within cylinder 22. Wedge extension spring 24 is fully extended by operation of retraction plate 27 of piston 20 on the roller 28 of linkage 26, and there is maximum distance between the brake shoe 102 and the rail 101. Force generation rollers 16a, 16b are located in a "home" position.

Figure 2:
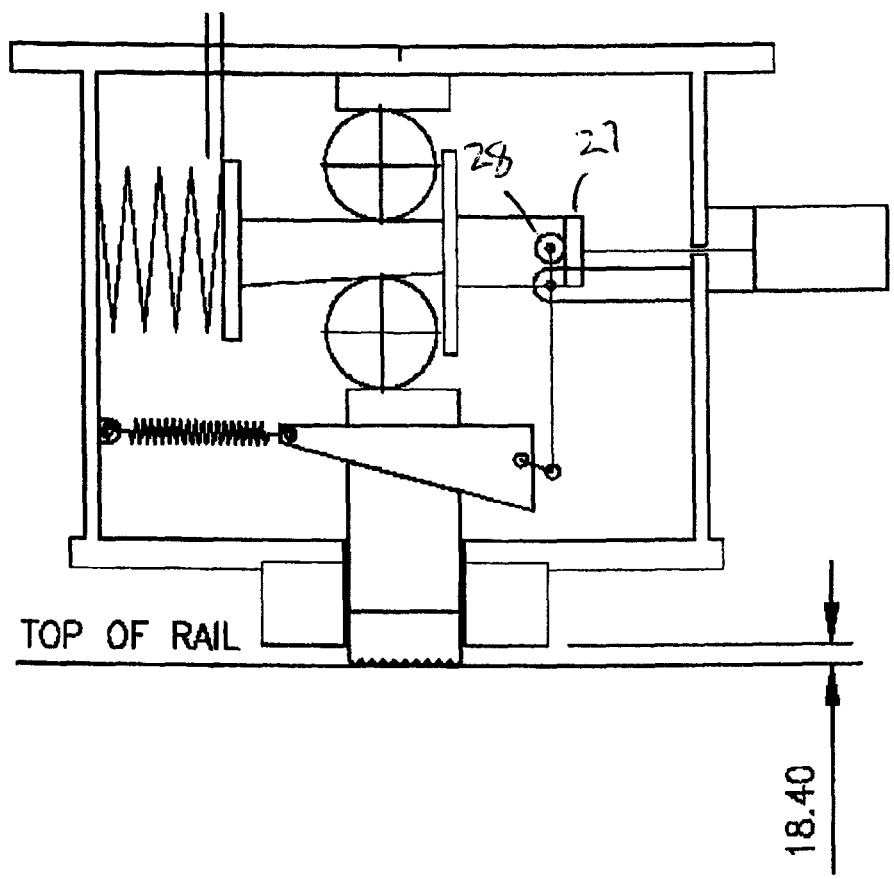
FIG. 2 is a cross-sectional view of the rail brake of FIG. 1, showing the rail brake in the brake set position, where clearance between the rail brake frame and the railhead is 18.40 units.

In FIG. 2, hydraulic pressure within cylinder 22 and been slightly relieved, allowing the power spring 18, cam 14 and rollers 16a, 16b to extend a small distance horizontally, and to push piston 20 deeper into cylinder 22. This in turn permits wedge extension spring 24 to draw intermediate wedge 108 into further engagement between the upper block 104 and lower wedge 106 by virtue of the release of linkage 26. The wedge 108 travels only until all the distance is taken up between the brake shoe 102 and the top of rail 101.

Figure 3:
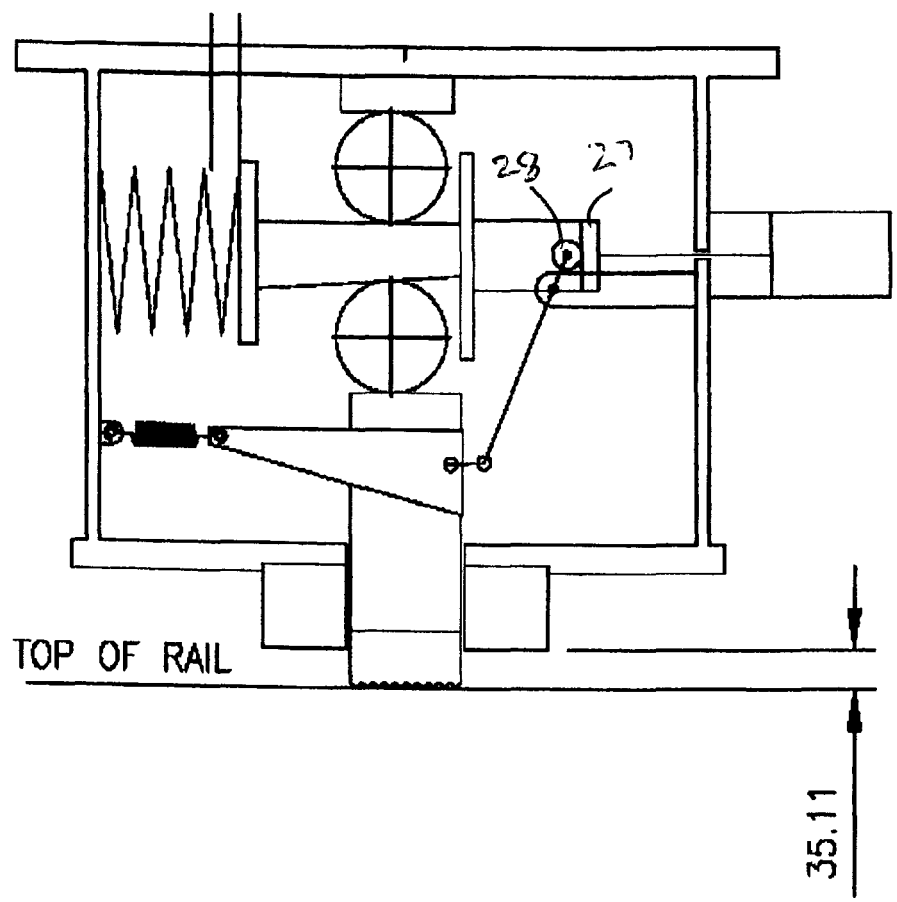
FIG. 3 is a cross-sectional view of the rail brake of FIG. 1, showing the rail brake in the brake set position, where clearance between the rail brake frame and the railhead is 35.11 units.

In FIG. 3, the power spring 18 has been extended somewhat further to allow the intermediate adjusting wedge 108 to take up the maximum distance between the brake shoe 102 and the rail 101. However, it should be noted that even at this maximum distance, at least 75% of power spring 18 stored energy remains. During each of the foregoing motions, the rollers 16a, 16b and power wedge cam 14 are advanced horizontally and produce a small downward movement. The rollers and power wedge cam may be kept loaded and free from slippage by loading springs (not shown), and the upper block 104 under the lower power roller 16b may be laterally restrained by suitable bearings and/or linkages. These elements are not illustrated in the Figures in order to provide principal clarity.

Figure 4:
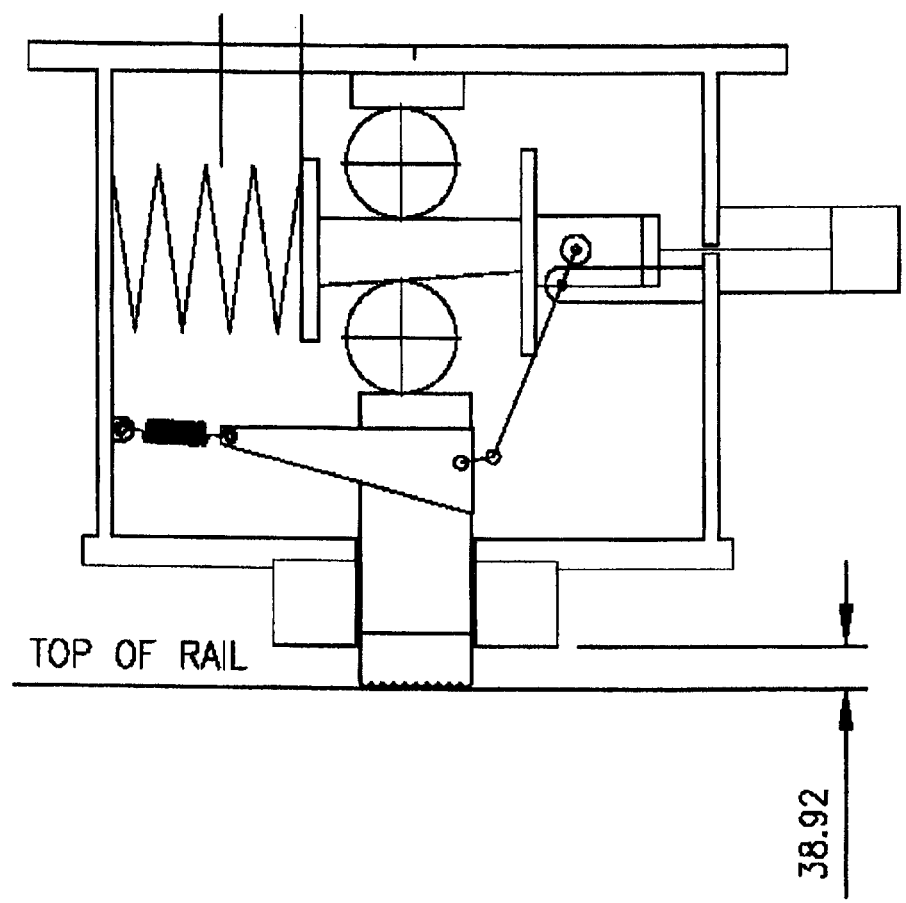
FIG. 4 is a cross-sectional view of the rail brake of FIG. 1, showing the rail brake in the brake set position, where clearance between the rail brake frame and the railhead is 38.92 units.

In FIG. 4, the rail brake 10 is shown with the wedge at maximum vertical rail deviation with high forces applied. It can be noted that the intermediate adjusting wedge 108 remains in essentially the same position, as the power wedge cam 14 has continued to travel and generate increasing forces. The amount of power wedge cam movement and corresponding power spring extension is dependent on the stiffness, or spring rate, of the rail and rail bed, and the machine to which the brake is mounted. The wedge, lever and attached lower link, allow small vertical movements, produced by the power wedge. The rail clamp is now producing high applied forces and capable of high resulting braking forces.

To release rail brake 10, hydraulic pressure is increased within hydraulic cylinder 22. The power spring is compressed and applied forces are steadily reduced, as the power wedge is retracted. The power wedge retracts until it reaches a point equivalent to about 25% of spring travel. At this point a plate comes in contact with the wedge lever cam rollers, thereby starting retraction of the adjusting wedge. Also, a plate mounted at the end of the power wedge contacts the power rollers, moving them towards their home position. It should be noted that all components are only subject to small forces during these motions. Retraction is now completed with all components returned to their home position with maximum clearance between rail and brake shoe. It should also be noted that the rail brake is also available to produce maximum output force at even minimum retracted clearance between brake shoe and rail. The adjusting wedge would simply move a minimum distance and the power wedge would produce high forces sooner; that is all. The adjusting wedge can take effect at an infinite number of positions.

The present description is of the best presently contemplated mode of carrying out the subject matter disclosed herein. The description is made for the purpose of illustrating the general principles of the subject matter and not to be taken in a limiting sense; the described subject matter can find utility in a variety of implementations without departing from the scope of the invention made, as will be apparent to those of skill in the art from an understanding of the principles that underlie the invention.

We claim:

1. An adjustable wedge assembly for a hydraulically releasable spring-set rail brake comprising a main power spring for biasing a brake shoe against a top surface of a rail, wherein the adjustable wedge assembly is operatively situated between the main power spring and the brake shoe and, in use, selectively expandable in a vertical direction, thereby selectively taking up a vertical distance that the brake shoe is required to travel between a brake release position and an initial railhead contact position, the adjustable wedge assembly comprising an intermediate wedge located for slidable engagement between a vertically movable upper block and a lower wedge, such that advancement of the intermediate wedge into further engagement between the upper block and the lower wedge increases the overall height of the assembly, and withdrawal of the intermediate wedge decreases the overall height of the assembly, wherein the main power spring of the spring-set rail brake is releasably held in compression by hydraulic force acting on a piston within a cylinder, and wherein a wedge spring biases the intermediate wedge into engagement between the upper block and the lower wedge, and a wedge retracting linkage operatively connected to the piston withdraws the intermediate wedge from engagement between the upper block and the lower wedge in a direction that is opposite the biasing force of the wedge spring after the hydraulic force within the cylinder is increased to a value above a restorative spring force of the main power spring.

2. The adjustable wedge assembly of claim 1, wherein the wedge retracting linkage is configured for a 5:1 lever ratio, such that the intermediate wedge is moved 5 units of length for each one unit of length that the piston acts on the retracting linkage.

* * * * *